UNITED STATES PATENT OFFICE.

FREDERICK WILLIAM A. WIESEBROCK, OF NEW YORK, N. Y.

MANUFACTURE OF BEER.

SPECIFICATION forming part of Letters Patent No. 510,827, dated December 12, 1893.

Application filed August 22, 1893. Serial No. 483,779. (No specimens.)

*To all whom it may concern:*

Be it known that I, FREDERICK WILLIAM A. WIESEBROCK, a citizen of the United States, and a resident of New York city, in the county and State of New York, have invented a new and useful Improvement in the Manufacture of Beer, and more particularly in that step of the manufacture called the Mashing Process, of which the following is a specification.

Since it has been demonstrated that good and wholesome beer can be made from malted grain and portions of unmalted materials, it has become the practice, in the manufacture of beer, of using large quantities of unmalted materials in the shape of meal, such as corn or rice meal, &c. These materials are deprived of their hull or fibrous portions previously to being used. The object of using such unmalted, farinaceous substances is to cheapen the cost of the production of beer, and to manufacture beer of pale color.

Owing to the obligatory process of filtering the wort through the residuum of the mash, after the mashing process is completed, it it necessary to supply the mash with sufficient fibrous material to accomplish this filtration. Formerly when beer was brewed from crushed barley malt only, the hulls of the malt entering the mash did supply sufficient filtering strata; but now, when corn meal can be procured for about one-third of the price of malt, and when it is desired to brew beer of a lighter color than can be made of pure barley malt, on account of the coloring matter supplied by the shell or hull of the barley malt, it has become difficult to filter the wort from the mash. When unmalted, farinaceous substances are used to any extent.

It is the object of this invention to still more reduce the cost of manufacturing beer, by enabling the brewer to use more unmalted material; and it is the further object of this invention to enable the manufacturer of beer to reduce the color of the beer at pleasure, and to always insure a rapid and brilliant filtration of the wort, by adding a sufficient quantity of prepared fibrous material to the mash. For this purpose, I supply the mash with a vegetable fibrous material, so prepared as to impart no foreign flavor to the beer, which will absorb superfluous color from the beer, and which will be harmless as food for cattle, when it is so fed, with the residue of the mash called brewers' grains.

The filtering material I prepare preferably from straw; this being the most agreeable as cattle feed when present in the residue of the mash; however, many other harmless vegetable fibrous materials may be used. The straw is first cut in short pieces of from one-fourth to three-fourths of an inch in length, and it is then subjected to a boiling and washing process with water (to which may be added a little soda) until all the extract matter has been removed. When this is accomplished the material is then placed in a bath of chloride of lime, and allowed to bleach to the desired whiteness. After it is removed from the bleaching bath, it is subjected to a pressing process, to save the chloride of lime solution which may be used again; it is then washed in a solution of hyposulphite of soda, then passed through a weak sulphuric acid solution, to remove all traces of the chloride of lime, and then it is pressed again, preferably between rollers, both for the purpose of removing part of the water and for making the fibers more pliable, after which it is put in a drier and made perfect dry, when it is ready for use. The above treatment removes the silicious coating from the straw, rendering the fiber porous, so that it will not only absorb water, and readily sink to the bottom of the mash and there serve as a filtering medium, but will also absorb and hold a portion of the coloring matter of the mash, rendering the resultant wort light and brilliant in color.

Vegetable fiber so prepared will not diffuse any flavor nor color to the beer wort with which it comes in contact; on the contrary, it having been made neutral, in taste and color, it will absorb and carry from the wort a portion of the color imparted thereto by the hulls of the malt, and otherwise carry off any flavors, sometimes present in old malt and meal.

In the process of mashing I proceed as follows: I use about twenty-five per centum of crushed barley malt, and seventy-five per centum of corn meal. The crushed malt is mixed in the mashing vat with hot water of the proper temperature, and the corn meal is mixed with cold water, and brought into the boiler provided for that purpose. When the corn meal mash has acquired a temperature of about 150° Fahrenheit in this boiler, I mix with it a portion of the malt mash from the mashing vat, of about one-fourth, and finish the boiling. When the boiling of the meal mash is completed, the same is cooled down rapidly to the saccharification temperature; meanwhile the malt mash in the mashing vat has also been maintained at the same temperature, and from one to three pounds of the prepared fibrous material for every barrel of beer which is going to be made has been added thereto; the prepared meal from the meal cooker, with the proper temperature, is run into the mashing vat and thoroughly mixed with the malt mash containing the fibrous material, and the saccharification process is allowed to proceed while the mashing machine is set at rest. The added fibrous material, in settling with the hully portion of the malt and with the insoluble albuminoids and glutinous portions of the meal, maintains such a porosity throughout the whole mash, that free access of the converting diastase to all portions of the mash is insured, and a more rapid saccharification is obtained than by any process now in use. The added fibrous material being bleached will absorb from the mash a portion of the color supplied thereto by the barley malt, and produce a beer of lighter color, which color may be varied in intensity according to the quantity of the fibrous material used. After the process of saccharification is completed, the whole mash is once more thoroughly mixed up, and then allowed to settle, after which the process of filtering the wort from the mash commences. The added fibrous material, together with the hulls of the malt, having precipitated to the perforated bottom of the vat, now form filtering strata of so large a porous area that the co-precipitated, insoluble, albuminous and glutinous matter leaves sufficient porosity in the filtering strata to insure smooth, clear, and rapid filtration, which is not the case when unmalted material is used to any extent in the mashing process heretofore in use. When the filtration is in progress, hot water is supplied to the surface of the wort in the mash tub, in the same proportion as the wort filters through at the bottom, until the residue, called brewery grains, is practically exhausted and removed to be used as food for cattle; the added fibrous material forming a part of this residue.

The fibrous material added to the mash, being pure vegetable fiber or cellulose, which is partially digestible when fed to cattle, while mixed with the gluten and albumen of the residue of the mash, forms a very valuable constituent therein, in temporizing the richness of the food.

The advantages derived by this, my process, are, more rapid saccharification and a more steady, easy, and rapid filtration of the wort than heretofore obtained; and by the use of this improvement, the cost of manufacturing beer becomes lessened, through the use of a greater quantity of unmalted material being permitted than is now used, and with less labor and in a shorter time, and the variation *ad libitum* of the paleness of the color of the beer is obtained.

I am aware that in British patent to Southby, No. 4,680 of 1887, oats, chaff, &c., are suggested as a filtering material for a mash consisting of malted maize and barley, and therefore do not claim broadly the use of vegetable fiber; but what I do claim is the use of a specially prepared fiber (fiber from which has been extracted by a chemical process the silicious and extractive matters), which will commingle with the mash and finally settle to the bottom of the tun and there form a uniform stratum, which will not only serve as a filtering medium, but will also serve as a color and impurity absorbent, insuring a rapid and brilliant filtration of the wort and permitting the use of a larger quantity than usual of unmalted material. It is a fact, well-known, that the unprepared hulls and chaff of cereals (such as employed by Southby) are enveloped in a silicious coating, which is hard and insoluble and effectually prevents the absorption of the liquids by the inclosed fiber, thereby preventing the material sinking in and mixing with the mash. This unprepared fiber, will not form a stratum at the bottom of the tun to filter the wort and absorb the surplus color and the impurities, and therefore could not possibly be used with any effect in a mash of malted and unmalted cereals.

Having thus described my invention, what I claim, and desire to secure by Letters Patent, is—

The process herein described of manufacturing beer, the same consisting in adding to a mash, prepared from malted and unmalted cereals, vegetable fiber from which the silicious and extractive matters have been removed, said fiber not only commingling with the mash and settling and forming a filtering stratum, but also forming an absorbent for color and impurities, whereby the color of the filtered wort may be regulated and a pure and brilliant wort is obtained, substantially as described.

In testimony that I claim the foregoing as my invention I have signed my name, in presence of two witnesses, this 10th day of August, 1893.

FREDERICK WILLIAM A. WIESEBROCK.

Witnesses:
R. M. JOHNSTON,
J. A. STERNER.